United States Patent [19]

Goodrich

[11] 4,257,703
[45] Mar. 24, 1981

[54] COLLISION AVOIDANCE USING OPTICAL PATTERN GROWTH RATE

[75] Inventor: George W. Goodrich, Bloomfield, Mich.

[73] Assignee: The Bendix Corporation, Southfield, Mich.

[21] Appl. No.: 20,769

[22] Filed: Mar. 15, 1979

[51] Int. Cl.³ .................. G01C 3/08; G01B 11/00
[52] U.S. Cl. .................................... 356/4; 356/28; 356/394; 358/105; 364/565
[58] Field of Search ............... 364/560, 562, 564, 565; 356/4, 28, 379, 394; 358/105, 107, 213

[56] References Cited

U.S. PATENT DOCUMENTS

| 3,453,047 | 7/1969 | Olson et al. | 356/4 |
| 3,661,459 | 5/1972 | Aoki | 356/4 |
| 4,071,853 | 1/1978 | Yamanaka | 358/213 |

Primary Examiner—Stephen C. Buczinski
Attorney, Agent, or Firm—Markell Seitzman; Russel C. Wells

[57] ABSTRACT

A passive electro-optical collision avoidance system disposed within a moving vehicle for generating a collision avoidance signal. The system comprises a lens, image sensor and image processor wherein the image processor generates a collision avoidance signal in response to the size of the image and its rate of growth.

20 Claims, 7 Drawing Figures

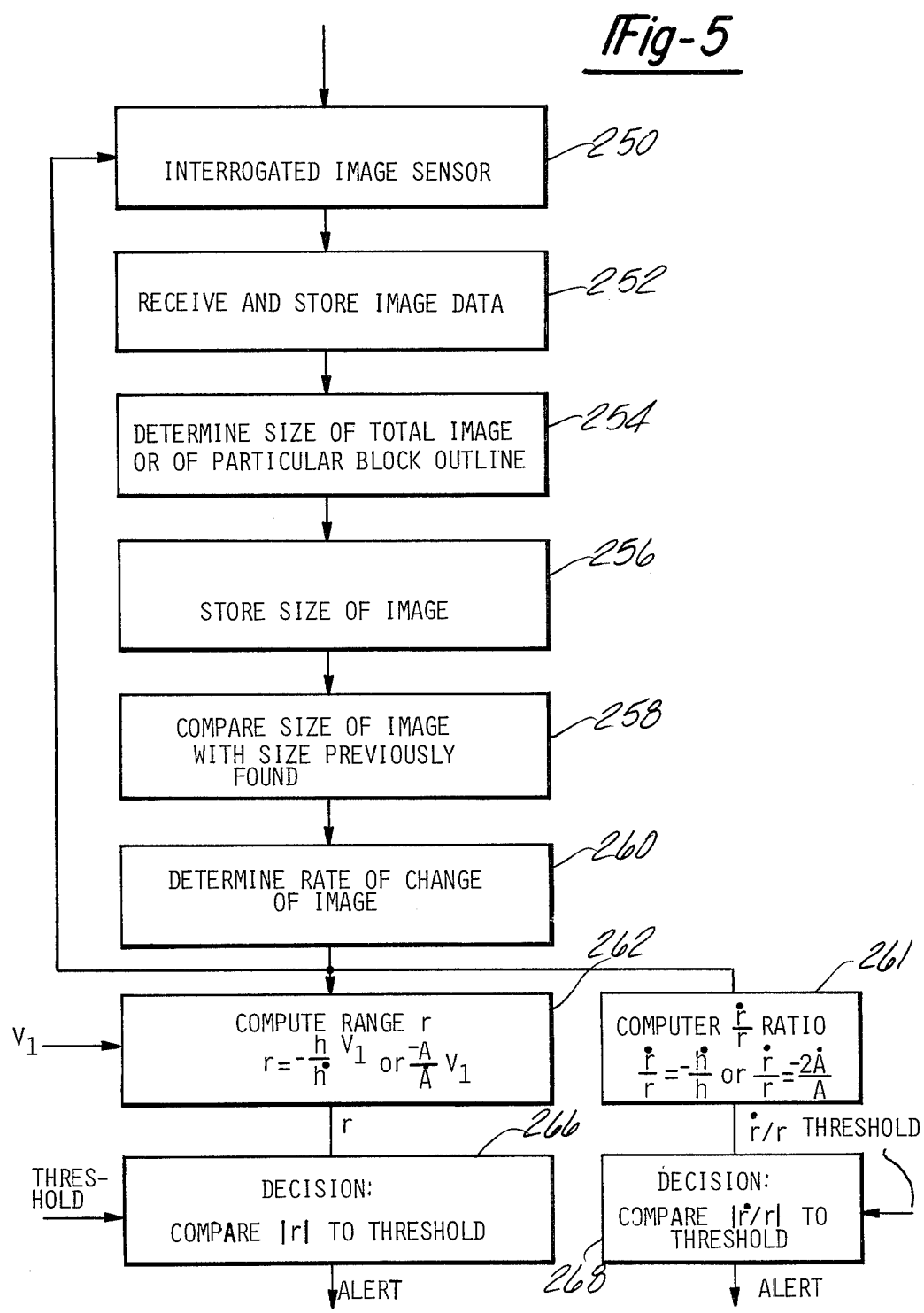

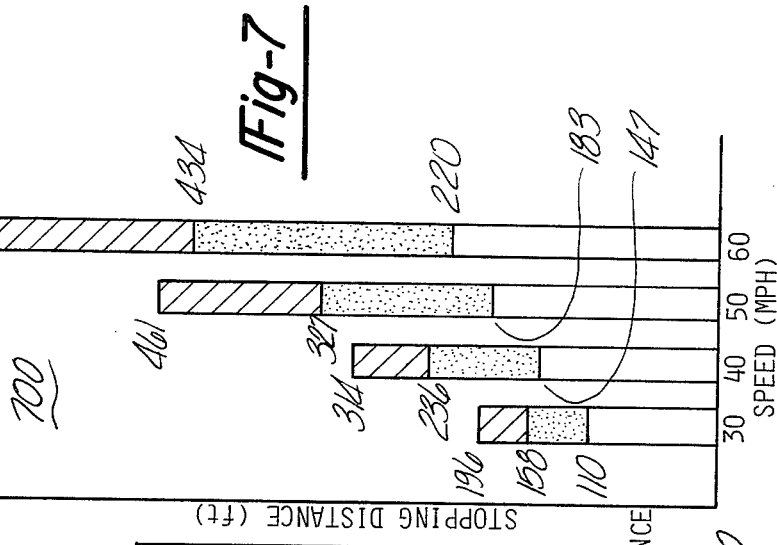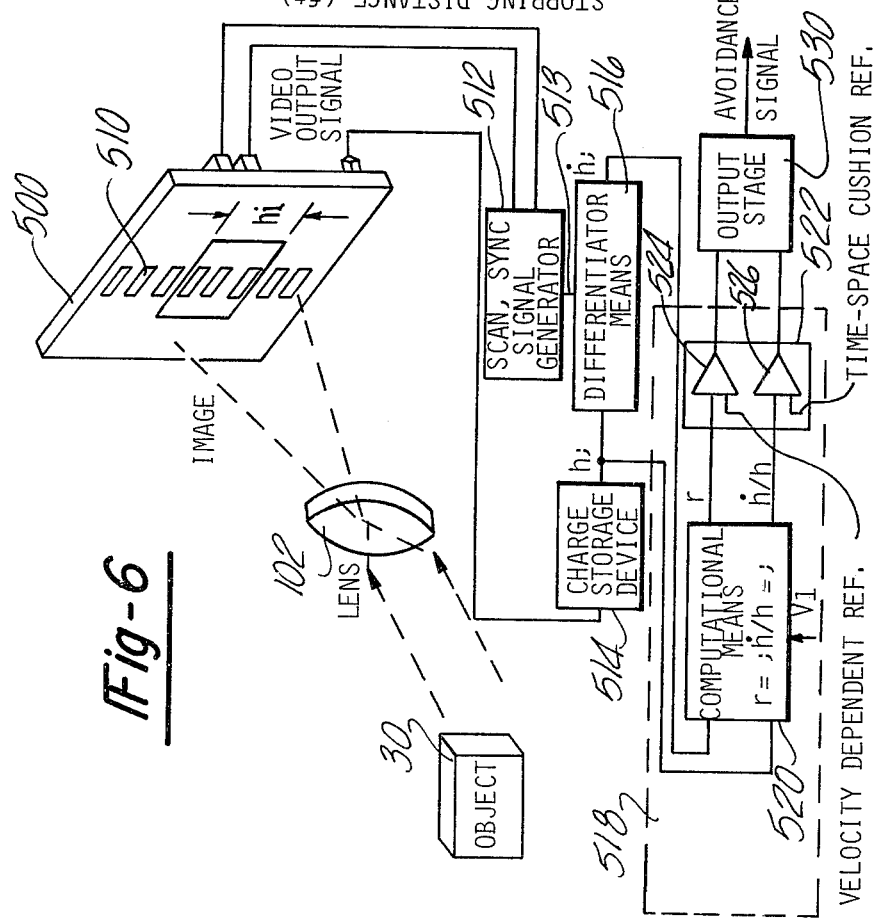

COLLISION AVOIDANCE USING OPTICAL PATTERN GROWTH RATE

BACKGROUND AND SUMMARY OF THE INVENTION

This invention relates to electro-optical systems and, particularly, to optical ranging systems for preventing the collision of a vehicle so equipped with a non-cooperating vehicle or other roadway object.

Collision avoidance schemes are well known and include systems utilizing radar and radio frequency, laser and optical techniques. A goal of each of these systems is to supplement operator (driver) control during such times when operator inadvertence causes the vehicle to approach an obstacle, or another vehicle, at an excessive rate of speed making safe stopping difficult or impossible.

Collision avoidance systems often require the active cooperation of the obstacle being avoided, that is, the obstacle often must be capable of receiving transmitted energy. Consequently, at a minimum, an antenna or reflector must be mounted to the obstacle. Often the obstacle, a second vehicle, is required to generate an independent signal therein requiring a second vehicle to contain a transmitter. This requires specific frequency assignments of the electro-magnetic radiation from one or both vehicles. In addition, care must be taken to avoid radiofrequency interference or prevent inadvertent activation of other vehicle systems such as adaptive braking systems.

It is a broad object of the present invention to supplement driver awareness of a dangerous situation, to help avoid accidents.

It is an object of the present invention to provide a collision avoidance system which literally watches the road scene ahead of the equipped vehicle independent of driver cooperation.

It is a further object of the invention to determine distance without the cooperation of the obstacle, object or vehicle to be avoided.

It is a still further object to determine the distance and closing rate between a vehicle and an object by measuring the rate of growth of the image and generating a collision avoidance signal when the rate of closure and distance between the vehicle indicate an impending dangerous condition.

These and other objects and purposes of the invention will be clear from the following detailed description of the invention.

Referring first to the bar chart shown on FIG. 7, which illustrates the total stopping distance as a function of vehicle speed. This chart gives an estimated number of feet your car will travel on dry and wet pavement from the time a typical driver perceives danger until he can bring his car to a stop. The stopping distance is segmented into two parts; the distance travelled before the driver reacts to a preceived danger and the distance travelled after the brakes are applied.

The perception/reaction distance 700 is based upon an average of 1.75 seconds between seeing the danger and deciding to stop and another 0.75 seconds to push the brake pedal to the floor. Thus, safe driving would necessitate having a time-space cushion of 2.50 seconds and its corresponding distance between the equipped vehicle and the roadway obstacle. Thus, at a minimum, a system which automatically provides this time-space cushion and supplements driver perception will permit the driver to respond or associated collision avoidance mechanisms to be initiated in a timely manner.

A system is disclosed to avoid a collision between an equipped vehicle and an obstacle reflecting optical radiation.

The invention is applicable to general highway driving conditions, however, the equipped vehicle need not be a car or truck but can be any other type of vehicle such as a people mover traversing within a dedicated guideway.

A particular advantage of this optical approach is that it is amenable to a variety of data processing strategies to overcome spurious responses. The present invention supplements driver awareness permitting automatic perception and mechanized comprehension of potentially dangerous driving situations. By the very optical nature of the collision avoidance system, it receives the cues that a driver should have seen. In addition, the optical nature of the invention readily permits the collision avoidance system to be integrated into visual surveillance systems of driverless vehicles.

The collision avoidance system comprises an electro-optical image sensor such as a charger transfer device and an image processor. An object such as another vehicle lying in the projected path of the equipped vehicle will have its image projected upon the electro-optical sensor. An image processor responds to the size of the projected image and its rate or rates of change, and the velocity of the equipped vehicle and determines the range of the object. If the object is too close for a given relative closure speed ($\dot{r}$) range (r), and closure speed range ratio (i.e. $r/\dot{r}$) between the object and the equipped vehicle, a collision avoidance signal is generated. The avoidance signal may activate an alarm alerting the operator of the pending emergency. Alternatively, the avoidance signal could be used to activate a collision avoidance system such as a speed control or braking mechanism.

In an alternate embodiment of the invention the lateral motion of objects with respect to the pathway of the equipped vehicle is also computed and a collision avoidance signal generated for the laterally approaching obstacle or vehicle.

BRIEF DESCRIPTION OF THE DRAWINGS

In the following figures:

FIG. 5 is a flow diagram illustrating a computation process.

FIG. 6 shows an alternate embodiment of an image sensing system having a single row of linear elements.

FIG. 7 is a chart showing the average stopping distances for an automobile travelling at different speeds.

DETAILED DESCRIPTION OF THE INVENTION

Figure 1:
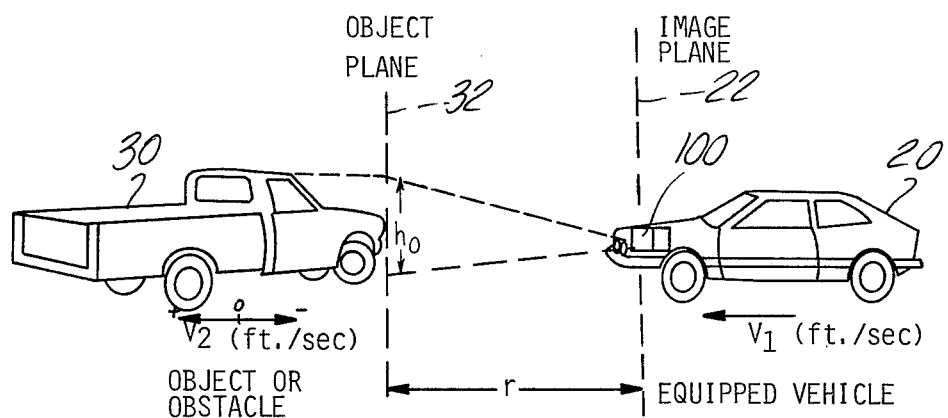
FIG. 1 shows a suggested mounting arrangement of the disclosed electro-optical collision avoidance system within a vehicle.

FIG. 1 shows a collision avoidance system 100 disposed within a vehicle 20 travelling at a measurable velocity $V_1$(ft/sec). The vehicle 20 is at an unknown distance r, from a roadway obstacle illustrated as a second vehicle 30. The obstacle, however, could be any other object within the projected path of vehicle 20. The obstacle may be at rest, or moving in the same direction, or moving across the path of the equipped vehicle 20 or approaching at an arbitrary rate of speed.

In the preferred embodiment the collision avoidance system 100 is mounted proximate the front end of vehicle 20. As viewed by the system 100 an image of the obstacle or vehicle 30 will be formed in the image plane 22 of an imaging means 110.

Figure 2:
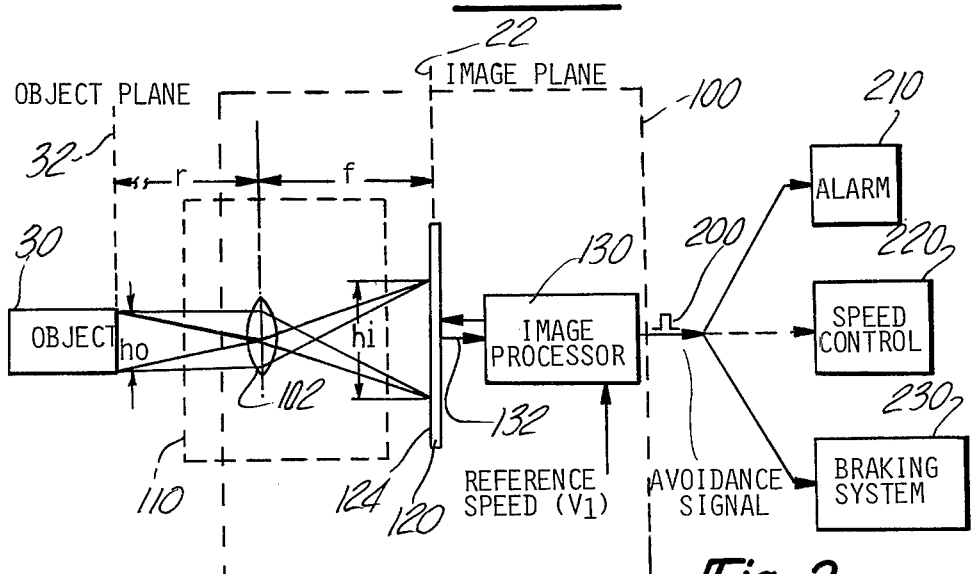
FIG. 2 shows the basic components of the collision avoidance system.

In the embodiment shown in FIG. 2, the sensing surface 124 of the image sensor 120 is located at the image plane of the lens 102, Furthermore, to achieve a system capable of operating in the rigors of a mobile environment the image sensor 120 is preferably a solid state electro-optical device having adequate resolution and a sensing surface 124 sufficiently large to receive images of the object 30.

One such device is a solid state charge coupled device such as area image sensor Model CCD11 manufactured by Fairchild Semiconductor, Mountainview, Calif.

The image processor 130 can be of the presently known type that converts grey scale scenes into block images.

In addition, the image processor 130 may include a mini or microcomputer, and will process the plurality electrical signals received from the image sensor 120 to create a variable indicative of the image size. Using a predetermined algorithm, the image processor 130 will generate a collision avoidance signal 200 when the relative distance r and the relative velocity $\dot{r}$ between the vehicle 20 and obstacle 30 indicate an unsafe condition. This signal may be used to activate an alarm 210, alerting the vehicle operator of the unsafe condition or to initiate automatic collision avoidance by activating a speed control system 220 or braking system 230.

Figure 3:
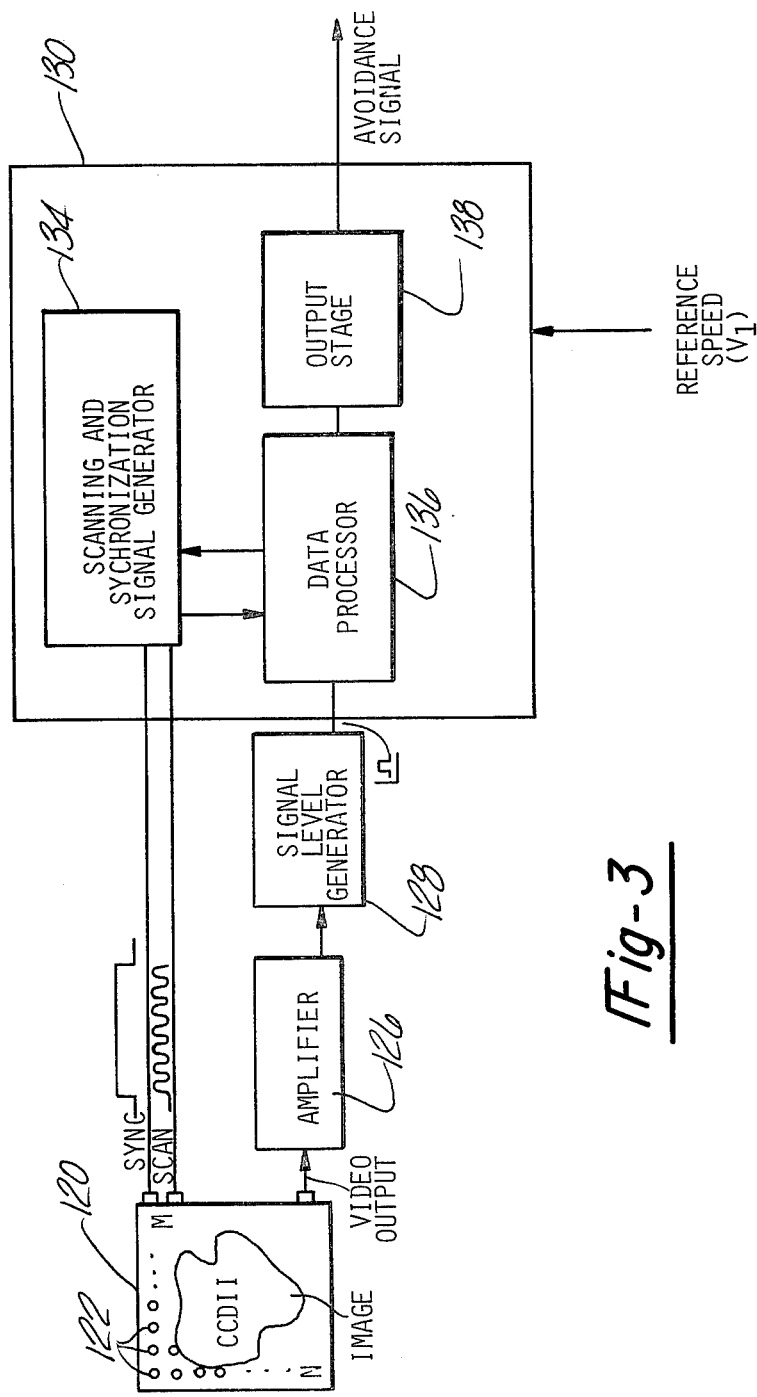
FIG. 3 illustrates a more detailed block diagram of the electro-optical collision avoidance system.

The following discussion is addressed to the method utilized to develop a computational method for the system shown in FIGS. 3 or 6 to generate a signal indicative of the height $h_i$ or area $A_i$ of the image. The concepts are similarly applicable to any other linear dimension of the image. One skilled in the art will appreciate that image area sensitive collision avoidance systems will be less prone to noise than a system sensitive to single linear dimensions such as height, width, etc.

From geometric optics, it can be shown that the height $h_i$, or Area $A_i$, of the image within the image plane 22 is related to height $h_o$, or area $A_o$, of the object 30 in its object plane and the unknown distance r between the lens 102 and the object plane 32 can be computed as a function of the focal length of the lens 102. This relationship is:

$$h_i/f = h_o/r; \; A_i/f^2 = A_o/r^2 \quad (1)$$

Differentiating the equation (1) with respect to time yields:

$$\dot{h}_i/f = (-h_o/r^2)\dot{r} = (-h_i/fr)\dot{r} \quad (2)$$

It follows that:

$$\dot{h}_i/h_i = -\dot{r}/r = -(V_2 - V_1)/r = -\dot{A}_i/2A_i \quad (3)$$

where $V_1$ and $V_2$ are the respective longitudinal velocities of the equipped vehicle 20 and object 30. In the case of a stationary object or an object moving perpendicular to the equipped vehicle $V_2$ equals zero and:

$$\dot{r} = -\dot{h}_i/h_i = V_1 h_i/\dot{h}_i = -2V_1 A_i/\dot{A}_i \quad (4)$$

If the roadway object is stationary, or moving perpendicular to vehicle 20 the above quantities of equation 4 are known permitting explicit solution for the relative distance r; in this example $V_1$ is the speed of the equipped vehicle.

Upon calculating the distance r corrective action can be undertaken when this distance r becomes smaller than a predetermined safe stopping distance. The predetermined safe stopping distance can be a preprogrammed velocity dependent relationship which is stored within the image processor 130 of FIG. 2 or decision means 518 of FIG. 5.

Consider again equation (3) and the information contained therein when the object is no longer necessarily stationary:

$$\dot{h}_i/h_i = (V_2 - V_1)/r = \dot{A}/A \quad (5)$$

The dimension of this equation is inversely proportional to time (1/sec). By equating the computed variable $\dot{h}_i/h_i$ or $\dot{A}/A$ to the reciprocal of the perception/reaction time-cushion of FIG. 7, a generalized mode of collision avoidance is attained. In this mode, an activation signal would be initiated when $\dot{h}_i/h_i$ or $\dot{A}/A$ is greater than the required reciprocal time cushion. Obviously, the reciprocal time cushion may be constant such as 1/2.5 seconds reflecting an average perception reaction time or a velocity dependent variable.

To generate a collision avoidance signal requires the image processor 130 to reproduce the scene, not in the general context of a visual image as performed within a television receiver but in the context of the invention by reproducing an electrical analog of image size. In this respect, the processor 130 is concerned with extracting the size of the image from the image sensor output. Techniques employing solutions to automatically locate objects in digital pictures are well known as shall be shown hereinafter. The techniques are applicable for recreating the boundaries around objects and are essential elements of pattern recognition, object tracking, image enhancement and data reduction applications. Consider an image processor 130 to be of a presently known type that converts gray scale scenes into block outlines. Techniques determining the size of an image by creating a matrix of block outlines to determine the image edges are well known in the art as is apparent from the article entitled *Boundary and Object Detection In Real World Images* by Y. Yakimovski, Journal of the Association For Computing Machinery October 1976, pages 599–618, which is expressly incorporated by reference. The image processor 130 having data processor 136 and output stage 138 break the total image into sub-blocks in accordance with the teaching of Yakomoviki, Shelman, and Hodges. The growth, if any, between corresponding blocks in successive frames is determined for example by totaling the number of seamed cells within each block and differencing the number in each from its corresponding predecessor block in the preceding frame. Of course, the linear growth rate used in equation 3 is almost exactly half the area growth rate since the area scales as the square of the linear dimensions. Only those blocks in the central region of the frame are of concern since they cover the pathway to be traversed. As the vehicle travels forward any significant new blocks will enter from the periphery of the field of view into the central regions due to be traversed by the vehicle. The lateral translation of the block can be monitored by the processor and a prediction made whether or not at its current lateral velocity, the block will clear or intersect the vehicle within the response-time cushion. In this way false alarms from crossing objects or curved roadways can be eliminated.

In addition, Shelman and Hodges present an analysis of their work describing a program which collects surface information such as area and perimeter of a picture; i.e. image. The paper entitled *A General Purpose Program for the Extraction of Physical Features from a Black and White Picture* to be found in Conference Record of the Symposium of Feature Extraction and Selection in Pattern Recognition, IEEE, Oct. 5–7, 1970. This paper is also expressly incorporated by reference. Other image processing techniques are shown by Morris in U.S. Pat. No. 4,124,871, Morton in U.S. Pat. No. 4,115,803, and Ito in U.S. Pat. No. 4,115,760 all of which are expressly incorporated by reference.

As taught by Yakimovski, picture analyses have assumed that (1) the image of an object is more or less uniform or smooth in its local properties (that is, illumination, color, and local texture are smoothly changing inside the image of an object); and (2) there is detectable continuity in local properties between images of two different objects.

The algorithms used, in work on automatic location of objects in digitized images split into two approaches: edge detection and edge following versus region growing. Edge detection applies local independent operators over the picture to detect edges and then uses algorithms to trace the boundaries by following the local edge detected. The region growing approach uses various clustering algorithms to grow regions of almost uniform local properties in the image.

In the present invention, once the size of an image or subimage outline is known and without making any judgements as to the interpretation of such outlines, it is possible by comparing successively computed dimensions to ascertain whether or not the outline of the image is growing from one computational interval to the next. If the dimensions are growing significantly, then the equipped vehicle 20 is closing upon the object 30 wherein it may be necessary to take action to avoid the collision.

Using the dimensional information stored during the previous computational cycle (n−1), the rate of change in dimension can be obtained. As an example, a simple algorithm for obtaining this rate of change of a dimension such as the height $h_i$, of the image is $$\dot{h}_i = (h_i(n) - h_i(n-1))/\Delta t \tag{6}$$

where $\Delta t$ is the time increment between computational intervals. One skilled in the art will realize that the above equation reflects a process of digital differentiation, which can be performed using analog components; however, the above discrete equation does reflect the preferred embodiment of the present invention.

Figure 4:
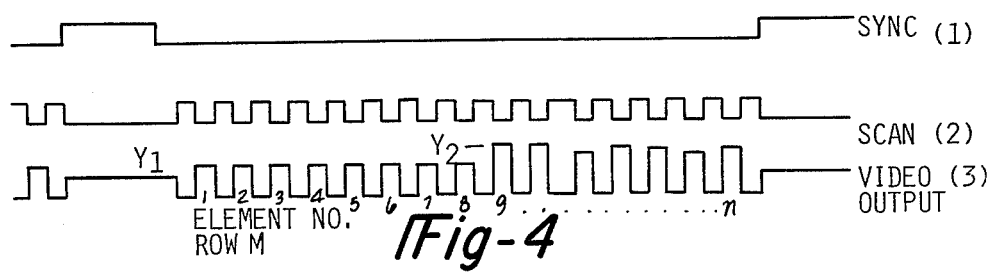
FIG. 4 is a timing diagram illustrating the output of a solid state image sensor.

Consider the system shown in FIG. 3 which shows a collision avoidance system comprising an image sensor 120 such as the solid state image sensor CCD11 having a matrix of photo sensitive elements 122. A video output is generated in response to received scan and synchronization signals generated by the scan and sync generator 134 of the image processor 130. Typical scan and synchronization signals are shown in FIG. 4. The output signal from the sensor 120 will be composed of a series of step-wise continuous pulses wherein the magnitude of each pulse is linearly related to the charge accumulated by each individual sensing element 122. The output of the image sensor 120 is connected to the input terminal of a buffer amplifier 126. The output of the amplifier 126 is received by the signal level generator 128. The output signal of the signal level generator 128 is a signal compatible with the input requirements of the image processor 130.

The operation of the system in FIG. 3 follows with reference to the waveforms in FIG. 4.

Consider an image sensor such as a solid state image sensor 120 which contains an m×n matrix of sensitive elements 122. A typical video output of the image sensor is contained in the timing diagram of FIG. 4, which also shows scan (clocking) and synchronization signals. These scan and sync signals originate at the image processor 130 and are equivalent to a scanning electron beam as used in vidcon or orthocon TV type camera tube.

In particular, the bottom wave form of FIG. 4 shows the output of each sensing element 122 of the $m^{th}$ row of the matrix of elements. This output signal contains discrete pulses varying from a voltage level $Y_1$ corresponding to an element receiving no radiation such as elements 1 through 8 to a voltage level $Y_2$ corresponding to a totally illuminated element such as element 9.

Charge coupled or charge transfer devices are well known in the art however a brief discussion of their operation is now presented. Generally, a charge coupled image sensor 120 will contain a matrix of individual photosensitive elements 122. Light energy incident upon these elements will generate a packet of electrons at each sensing element 122. The charge is transferred directly into a plurality of data registers which are gated by the sync signals generated by the processor. Each row or column of the matrix of elements 122 is interrogated in a predetermined order which may vary with different types of solid state charge transfer image sensor.

The image sensor 120 will transfer each of these charge packets to an output terminal in response to the synchronization and scanning signal or series of signals from the image processor 130 as shown in FIG. 4. Upon transfer of the charge, each element is reset to a quiescent signal level $Y_1$. The amount of charge accumulated by each element 122 is typically a linear function of the intensity of incident illumination and the length of time each element is irradiated. The output signal of the charge coupled device (120) shown in FIG. 3 is designated video output and is a composite of elemental signals generated upon interrogating each element of the matrix of elements and displays a step-wide linear relationship.

It should be appreciated that the greater the number of elements on the image sensor, the greater the resolution of the perceived image. Alternatively, an image sensor having few sensitive elements will create a mosaic only approximately the actual image.

The accuracy of the size of the perceived electrical image will also depend upon the repetition rate of the scanning process. The scan rate must be sufficient to create an accurate image at the maximum rate of closure between the object 30 and vehicle 20 which may be in excess of 100 miles per hour.

The image sensor 122 output is amplified and conditioned by the amplifier 126 and the signal level generator 128 respectively prior to being received by the image processor 130.

The output of the signal level generator 128 determines within the data processor 136 the size of the central image blocks and the rate of change of the size of the central image blocks and their lateral velocity. The image processor calculates the size of the image, its rate of change, and the velocity of closure between the object and the vehicle. The data processor further contains decision means to determine whether or not corrective action need be initiated. If corrective action need be taken an interim signal is generated which actuates the output stage 138 to develop an avoidance signal.

Reference is now made to FIG. 5 which is a flow diagram of the processes performed within the image processor 130 and its sub elements, the scan and sync signal generator 138 and data processor 136.

The scan and sync signal generator 138 interrogates the image sensor 120 (block 250). In response, to the signals each element of the sensor is serially interrogated and the charge packet (i.e. output signal), is transferred from the image sensor 120 and received and stored within the data processor 130 (block 252). After interrogation of the entire array of elements 124 the stored data is processed to determine the edge area, A, coordinates or predetermined dimension of the image (block 254) or subimage.

Having determined the boundaries of a particular image or subimage during a particular processing interval n, a dimension such as area $A_n$, height $h_n$, width $w_n$, or other dimension such as diagonal $D_n$ of the entire image or particular block outline or sets of block outlines of the total image is calculated and stored within the processor 130.

By comparing this information with the information stored during the previous computational cycle (n−1) the change in the predetermined dimension can be obtained (block 258). The rate of change is then computed by dividing the computed change in the predetermined dimension by the time $\Delta t$ between scans (block 260).

The relative closure rate range ratio and velocity $\dot{r}$ may then be computed in accordance with equations 3 and 4 respectively as shown in blocks 262 and 264. A comparison is then made in blocks 266 or 268 comparing these computations to a threshold variable and an alert signal is generated. The alert signal is input to a buffer or output stage 138 which generates the collision avoidance signal.

Referring to FIG. 6, there is shown a ranging system, using a single linear dimension of the image such as the height, width or other single linear dimension of the image falling upon the image sensor 20. The linear dimensional ranging system can provide range measurements at a savings in cost of hardware and result in other efficiencies because of the reduced data processing requirement.

The image sensor 500 shown in FIG. 6 has a single array (a column array) of photosensitive elements 510 in contrast to the matrix or area array previously discussed. The image sensor 500 receives scan and sync signals from a scan and sync signal generator 512 during each scan cycle in the same manner as discussed with reference to the system of FIG. 3. The output of the image sensor 500 is received by a storage device 514, which can be a device comprising a capacitor. The charge storage device accumulates the individual voltage signals of each element of the column array to generate an output signal indicative of the height, $h_i$ or other dimension of the received image. Alternatively, the edge position, i.e. height of the image, can be obtained using the teachings of Freedman as disclosed in U.S. Pat. No. 3,676,687 issued July 11, 1972, which is expressly incorporated by reference. The output of the charge storage device 514 is received by a differentiator means 516 which develops a signal indicative of the rate of change of the output of device 514, i.e. $\dot{h}_i$. The output of device 514 and the differentiator means 516 are input to a decision means 518 which generates signals indicative of the fact that corrective action need be taken. The output of the decision means 518 drives an output stage 530 which produces the avoidance signal.

The operation of the system shown in FIG. 5 is as follows:

The image sensor 500 receives a sync and scan signal from the sync and scan signal generator 512. During each scan cycle, every element of the column array is sampled. The image processor 500, in response to the signals received during the scan cycle will transfer the accumulated charge of each element 510 to the storage device 514. The output of device 514 is a signal proportional to the total accumulated charge which is indicative of the height $h_i$, of the image. The output of device 514 is differentiated by differentiator means 516 yielding $\dot{h}_i$. Both signals are input to the decision means 518 which using equation 3 or 4 or the like determines whether or not corrective action need be taken. In particular, after computing the relative range $\dot{r}$ or velocity range ration $\dot{r}/r$ (or $\dot{h}/h$), a comparison is then made to determine if the range (r) is too small for a given velocity $V_1$ or that $\dot{h}/h$ is too large. The decision means 518 may comprise a computational means such as the Multifunction Converter Model 4301 or 4302 manufactured by Burr-Brown, Tuscon, Ariz. The output of the converter is input into a comparator means 522. For the sake of discussion, comparator means 522 comprises a plurality of differential amplifiers 524 and 526, each having its threshold deferred by a reference voltage. Consider now amplifier 524, its reference voltage can be viewed as a minimum safe stopping distance which can be a function of the velocity of the equipped ($V_1$). Alternatively, the reference voltage input to amplifier 526 can be the constant voltage proportional to the time-space cushion previously discussed. If corrective action need be taken, the decision means 518 generates an interim signal.

Changes and modifications in the specifically described embodiments can be carried out without departing from the spirit and scope of the invention which is intended to be limited only by the scope of the appended claims.

I claim:

1. A collision avoidance system carried by a first vehicle for initiating corrective action in accordance with the relative motion between the first vehicle and an object, including a non-cooperating second vehicle, disposed at a distance r and having a velocity $\dot{r}$ relative to the first vehicle, said system comprising:

image sensor means, adapted to be carried by the first vehicle, for transducing an image of the object into electrical signals;

image processor means for generating a rate-range ratio ($\dot{r}/r$) including:

first means responsive to said electrical signals for generating a first signal indicative of the size of said image;

second means, responsive to said first signal for generating a second signal indicative of the rate of growth of said image;

third means for generating said rate-range ratio including means for dividing said second signal by said first signal;

fourth means for generating a value indicative of the time necessary to perceive and react to a situation indicative of a pending collision between said first vehicle and said object;

comparing means for comparing said rate-range ratio with said value; and signal means for generating a collision avoidance signal when said rate-range ratio exceeds said value.

2. The system as recited in claim 1 further including means for responding to said collision avoidance signal to initiate corrective action.

3. The system as recited in claim 2 wherein said means for responding to said collision avoidance signals is an alarm to appraise an operator of said vehicle of said collision avoidance signal.

4. The system as recited in claim 1 wherein said image sensor means includes a lens disposed between said image sensor means and the object to be sensed.

5. The system as recited in claim 4 wherein said lens has a focal length f.

6. The system as recited in claim 1 wherein said electrical signals generated by said image sensor means are indicative of a predeterminable grey scale.

7. The system as recited in claim 6 wherein predetermined gray scale is indicative of the quantity of light received from said object.

8. The system as recited in claim 2 wherein said image sensor means is responsive to a single dimensional component of said image.

9. The system as recited in claim 8 wherein said single dimensional component of said image is image height.

10. The system as recited in claim 9 wherein said rate-range ratio is equal to $(\dot{h}/h)$ wherein h is the height of said image and $\dot{h}$ is the rate of change of said image.

11. The system as recited in claim 2 wherein said image processor means further includes lateral means responsive to the relative lateral motion between said first vehicle and said object for generating a signal indicative of said lateral motion, and where said signal means further includes means for generating a collision avoidance signal in response to said image rate of growth, image size, first vehicle velocity and the signals indicative of said lateral motion signals.

12. The system as recited in claim 1 wherein said fourth means including means for generating a signal indicative of the velocity of said first vehicle and wherein said value is velocity dependent.

13. The system as recited in claim 12 where said value is a constant.

14. The system as recited in claim 13 wherein the reciprocal of said value is 2.5 seconds.

15. A collision avoidance system carried by a first vehicle for initiating corrective action in accordance with the relative motion between the first vehicle and an object including a non-cooperating second vehicle and the first vehicle comprising:

an image sensor means, adapted to be carried by the first vehicle, for transducing an image of an object focused thereon into electrical signals;

imaging means responsive to radiation from the object of projecting on said image sensing means said image of said object;

image processor means responding to said electrical signals for generating a size signal indicative of the size of the image projected thereon;

differentiator means for generating a rate of change signal indicative of the rate of change of said size signal;

decision means responsive to said size signal, and said rate of change signal for generating a collision avoidance signal indicating that corrective action need be taken wherein said signal is proportional to the ratio of said rate signal to said size signal; and means responsive to said collision avoidance signal for generating a signal to initiate correction action.

16. The system as recited in claim 15 wherein said image processor means further includes:

means responsive to the lateral motion of said object relative to said first vehicle for generating a lateral velocity signal indicative of the lateral velocity of said object and where said decision means further comprises means responsive to said size signal, said rate of change signal, said first velocity signal and said lateral velocity signal for generating a collision avoidance signal indicative of the fact that corrective action need be taken.

17. The system as recited in claim 16 wherein said image sensor means is a solid state charged coupled optical sensor.

18. A method of avoiding a collision of a first object with a second object, the method comprising the steps of:

generating an optical image of the second object;

detecting said optical image to generate signals indicative of the size of the image of said second object comparing the size of sequentially detected images of said object to generate a collision avoidance signal as a function of the rate of growth of said image divided by the size of said image.

19. A method of avoiding a collision between a moving first object with a second object, the method comprising the steps of:

comparing sequentially generated first signals to generate a second signal indicative of the rate of growth of said image;

generating the ratio of said second signal to said first signal; and then comparing said ratio to a threshold level to generate a collision avoidance signal when said ratio equals said threshold level.

20. A collision avoidance system, carried by a first vehicle, for generating a collision avoidance signal in accordance with the relative motion between the first vehicle and an object, including a non-cooperating second vehicle, disposed at a distance r and having a velocity $\dot{r}$ relative to the first vehicle, the system comprising:

first means adapted to be carried by the first vehicle for transducing a signal indicative of the size of said object;

processor means responding to said first means for generating a collision avoidance signal indicative of the ratio of $\dot{r}/r$; and means responsive to said collision avoidance signal for generating a signal to initiate corrective action.

* * * * *